United States Patent [19]

Anson

[11] 4,002,937
[45] Jan. 11, 1977

[54] MAGNETIC SENSING DEVICE
[75] Inventor: James H. Anson, Auburn, Ill.
[73] Assignee: Dickey-john Corporation, Auburn, Ill.
[22] Filed: July 3, 1975
[21] Appl. No.: 593,028
[52] U.S. Cl. .............................................. 310/168
[51] Int. Cl.² ...................................... H02K 21/14
[58] Field of Search .......... 310/152, 156, 168, 263, 310/157, 431, 42; 335/303, 306

[56] References Cited
UNITED STATES PATENTS

| | | | |
|---|---|---|---|
| 2,651,733 | 9/1953 | Stark | 310/263 X |
| 3,273,001 | 9/1966 | Baermann | 310/152 |
| 3,571,640 | 3/1971 | Watt | 310/168 |
| 3,710,158 | 1/1973 | Bachle et al. | 310/156 |
| 3,710,291 | 1/1973 | Nicoud | 335/306 |
| 3,849,682 | 11/1974 | Binns | 310/263 X |

Primary Examiner—Donovan F. Duggan
Attorney, Agent, or Firm—Olson, Trexler, Wolters, Bushnell & Fosse, Ltd.

[57] ABSTRACT

Disclosed is a sensing device for monitoring the rotation of a shaft or other mechanical movements. A magnetic structure is positioned on the shaft for rotation therewith and provides a plurality of discrete magnetic poles about the shaft at uniform spaced apart locations. The magnetic structure is formed of flexible plastic, permanent magnet material cut in a castellated configuration to form a plurality of uniformly spaced apart magnetic pole elements.

7 Claims, 15 Drawing Figures

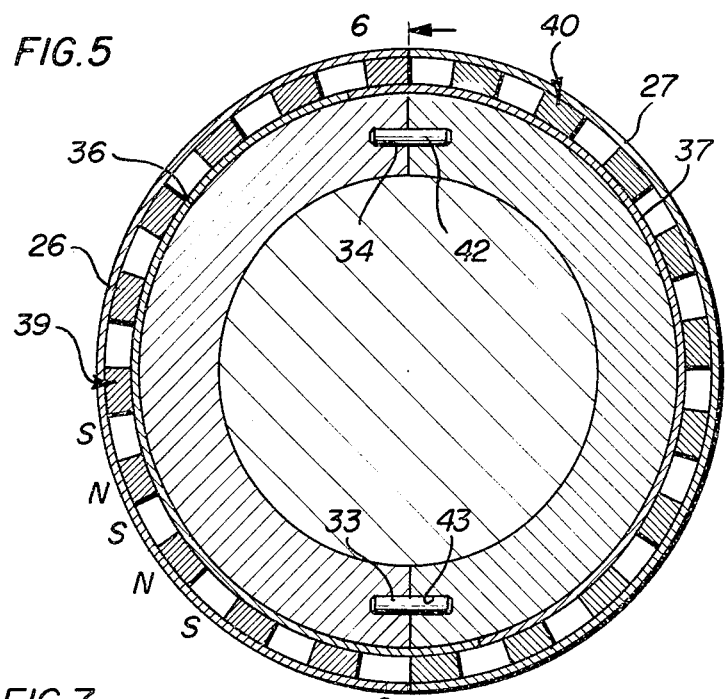
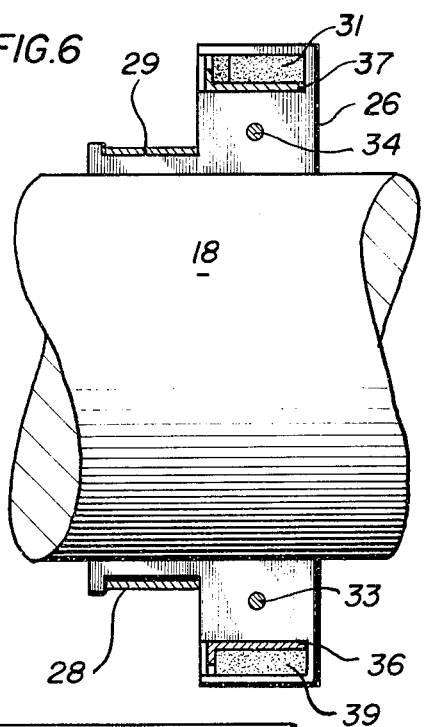
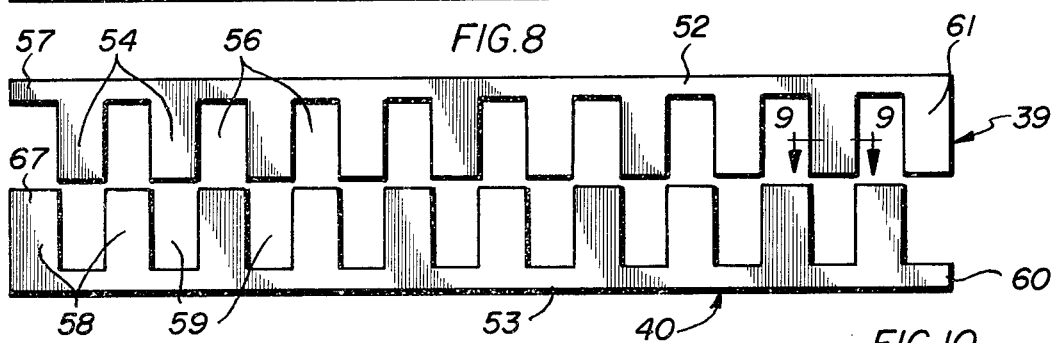
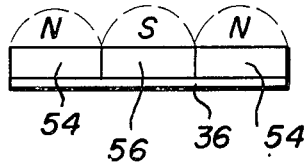
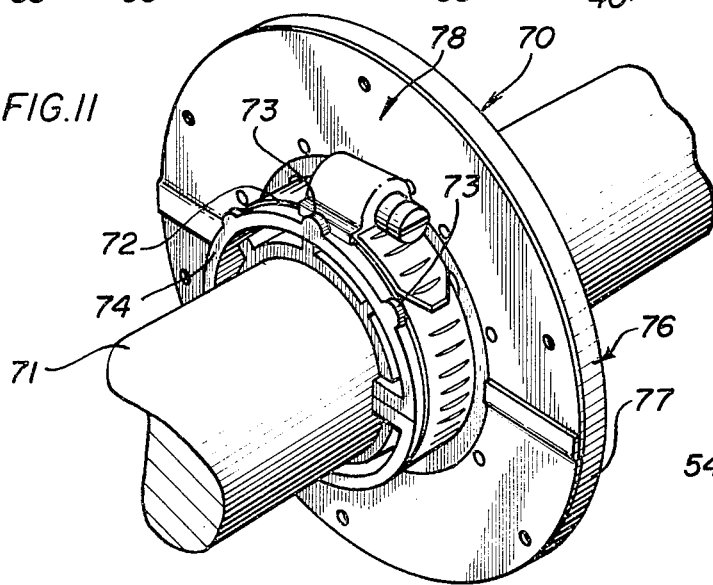
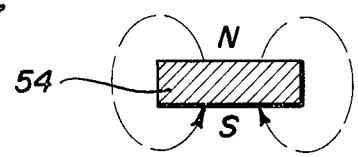

MAGNETIC SENSING DEVICE

BACKGROUND OF THE INVENTION

This invention relates generally to means for monitoring the rotation of a shaft or other rotateable member and more particularly to a magnetic device adapted to be mounted for rotation with the member and cooperable with responsive means for providing signals in accordance with the rotation of the shaft or member.

Heretofore, a number of different suggestions have been made for detecting or monitoring the rotation of a shaft or member. Certain of such means utilize structures including a perforated disc with a photoelectric sensing element on one side and a light source on the other side. As the disc rotates, light shining through the perforations provides a plurality of signals. Another previously suggested approach contemplates the use of a reed switch actuated by a single magnetic member rotateable with the shaft to provide the desired signals, but this approach obtains only one signal for each shaft rotation whereby difficulties may be encountered in monitoring relatively slower devices. Still another suggestion is to provide a unit with a plurality of separate permanent magnets positioned around the shaft or rotateable member, but this approach requires a relatively complicated and expensive structure.

While features of the present invention may be utilized for monitoring shafts or rotateable members in a variety of types of machines or apparatus, it is contemplated that the invention will be especially suitable for use in agricultural equipment. Such equipment is subjected to rough use in a hard environment so that maintenance or replacement of parts of monitors of the type contemplated herein may be required. Since a malfunction may occur at any time and particularly in the field, it is desirable that the monitoring unit and parts thereof be constructed so that replacement, maintenance or adjustment can be accomplished with a minimum of specialized training and skill and preferably by the operator.

SUMMARY OF THE INVENTION

Accordingly, it is an object of the present invention to provide a novel magnetic unit for a sensor for monitoring the rotation of a shaft or other rotateable member which overcomes the aforementioned problems and disadvantages of heretofore suggested devices.

A more specific object of this invention is to provide a novel magnetic device for a sensor of the type described which has a plurality of discrete pole elements mountable for rotation with a member to be monitored and having a structure which is relatively simple and inexpensive to manufacture.

Still another specific object of the present invention is to provide a novel magnetic device of the type described which is of relatively simple and economical construction and which also provides a relatively large number of alternating magnetic pole portions for more efficiently and effectively actuating a sensor.

Still another object of the present invention is to provide a novel magnetic device of the type described which is constructed so that it is relatively easy to install or replace in the field and so that the need for skilled adjustment is minimized.

A device is disclosed herein for illustrating the invention which utilizes a strip of flexible magnetic material which can be magnetized to obtain predetermined magnetic pole configurations. The pole configuration preferably utilized herein is one wherein the north pole is on one side of the strip and the south pole on the opposite side. The magnetic strip is punched or severed to provide a generally castellated configuration comprising a series of annularly spaced, but interconnected segments. A pair of complementary strips is provided in order to complete the annular configuration which strips may conveniently be fabricated from a single length of blank material.

A housing, preferably formed in two parts, is provided for supporting the aforementioned magnetic strips and is constructed so as to facilitate mounting for rotation with the member to be monitored. As previously indicated, each segment of the magnetic strip has a north pole on one side and a south pole on the other. Backup plate means of magnetic material is positioned adjacent the other side of the strip and traverse spaces between the segments so as to combine with the segments to present relatively strong alternate north and south poles facing in a desired direction for actuating a sensor which is mounted adjacent the magnetic unit. The sensor which may be in the form of a pickup coil provides output signals or pulses to a circuit which in turn controls means providing an indication of the status of the rotateable member.

These and many other objects and features of the present invention will be more fully realized and understood from the following detailed description when taken in conjunction with the accompanying drawings wherein like reference numerals are used throughout the various views to designate the same elements.

BRIEF DESCRIPTION OF THE DRAWINGS

FIG. 5 is an end view of the magnetic device and shaft illustrated in FIG. 3;

FIG. 6 is a view taken along line 6—6 of FIG. 5 showing the interface of one-half of the structure of FIG. 3;

FIG. 7 is a plan view of a flexible magnetic strip utilized in accordance with this invention before it is cut into discrete magnetic pole elements;

FIG. 8 illustrates the pair of magnetic strips forming discrete pole elements in accordance with this invention;

FIG. 9 is a sectional view taken along line 9—9 of FIG. 8 illustrating the magnetic pole configuration of the magnet material;

FIG. 10 is a diagrammatic representation of the alternate north and south poles obtained by utilizing the castellated magnetic material and a metal backup strip in accordance with this invention;

FIG. 11 is a perspective view of an alternate form of magnetic sensor for mounting to a shaft in accordance with the principles of this invention;

DETAILED DESCRIPTION OF THE PREFERRED EMBODIMENTS

Figure 1:
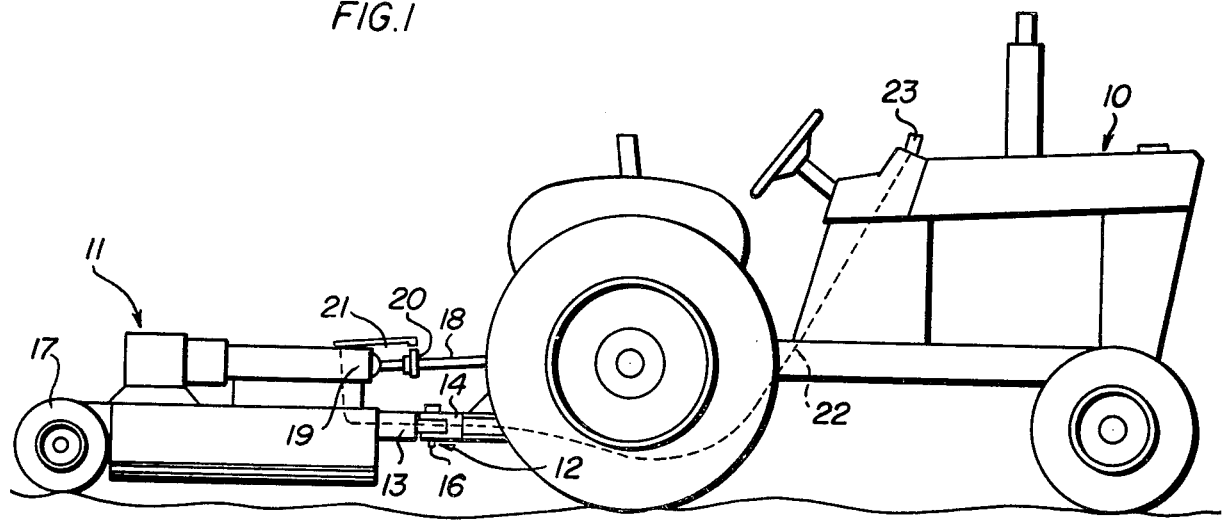
FIG. 1 illustrates a tractor pulling an agricultural device, such as a grass cutter or the like, operated by a rotating output shaft coupled to the tractor.

Referring now to FIG. 1 of the drawings, there is seen an agricultural machine wherein the sensor of this invention is utilized. Here a tractor 10 is illustrated pulling a cutting apparatus 11 by means of a tow bar coupling 12. The tow bar coupling 12 may include male and female sockets, 13 and 14 respectively, and a pin or assembly bolt 16 extending through aligned apertures in the sockets. The cutter is supported by wheels 17 mounted at the rear thereof. The power shaft 18 extends from a power output coupling of the tractor and is secured to the cutter 11 by means of a coupling 19. While a cutter such as a lawn mowing device is illustrated herein, it will be understood that the equipment powered by the shaft 18 can be of any suitable nature and further that the sensing system of the present invention may be used to monitor wheels, shafts or other rotateable members in all types of machines and apparatus.

Figure 2:
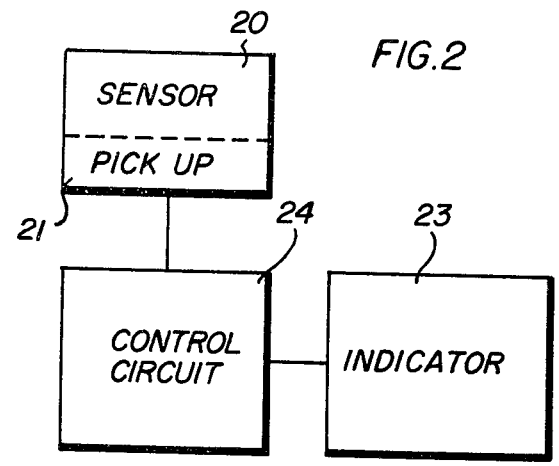
FIG. 2 is a simplified block diagram of the overall shaft sensing circuit arrangement of this invention.

In accordance with one form of this invention, a magnetic device 20 described in detail below is secured to the shaft 18 and rotates therewith. A pickup element 21 is mounted to the housing of the cutter and senses a rotating magnetic field of the magnetic device 20. The output of the pickup device 21 is delivered over a cable 22 to a readout device 23 mounted on the tractor. Therefore should shaft 18 cease to rotate or rotate at a speed which deviates from a desired speed, the magnetic device causes the pickup element to provide signals indicating the status of the shaft rotation. The circuitry of the readout device is such as to respond to such signals to indicate that the rotation of the shaft has stopped or deviated from the desired rate. It will be understood that any suitable means may be coupled between the unit 20 and the pickup element 21 to provide a control circuit for operating the indicator 23. In FIG. 2, the control circuit is generally designated by reference numeral 24 and is intended to include the appropriate circuitry necessary for operation.

Figure 3:
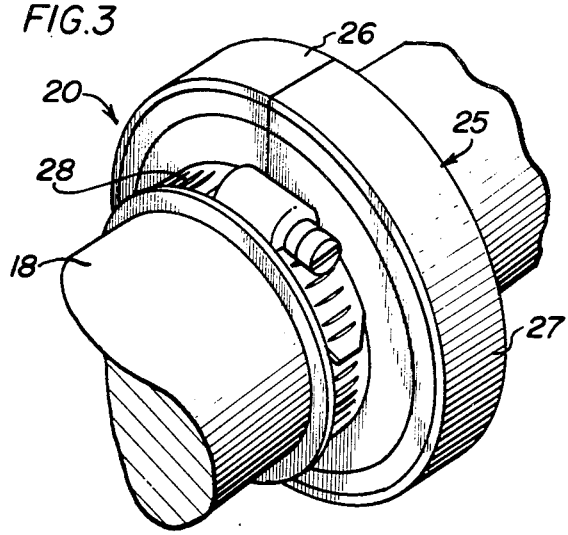
FIG. 3 is a perspective view showing one form of a magnetic sensing device coupled to a rotating shaft for detecting the rotation thereof.

Referring to FIG. 3, there is shown an enlarged perspective view of one form of the magnetic device 20 of this invention. The device 20 includes a housing 25 formed of two complementary generally semi-annular housing members or halves 26 and 27. These complementary members have main body portions and inner-marginal axially extending semiannular flanges 29 and 30 adapted to fit around a shaft or rotateable member to be monitored. An annular hose clamp 28 of any known construction releaseably encircles the flanges 29 and 30 for securely fixing the unit with respect to the rotateable member while enabling the unit to be easily removed and replaced if necessary.

Figure 4:
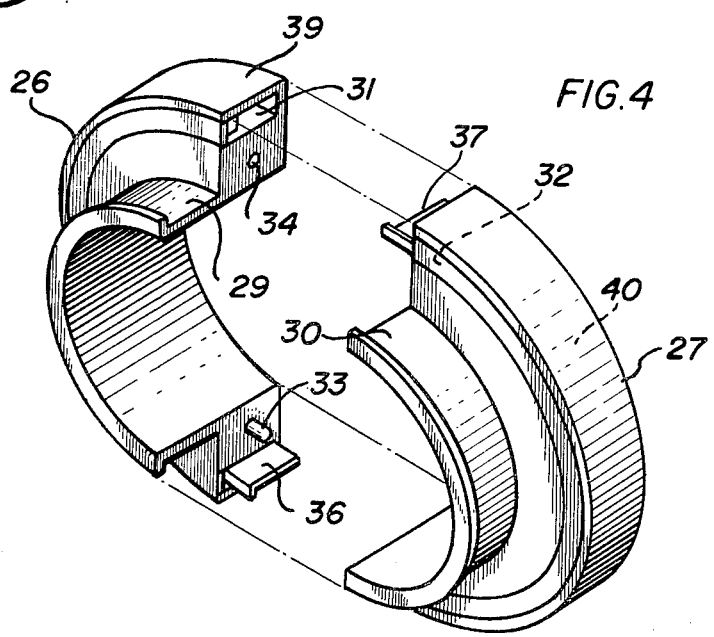
FIG. 4 is a perspective exploded view of the magnetic sensor illustrated in FIG. 3.

The main body portions of the housing members 26 and 27 are provided with semi-annular channels 31 and 32 as shown best in FIG. 4 respectively adapted to receive and retain semi-circular magnetic assemblies constructed in accordance with features of this invention as described below. The housing member 26 is further provided with a guide pin 33 adjacent one end thereof and a guide hole 34 toward its opposite end as shown in FIG. 4. A corresponding guide pin 42 insertable into the hole 33 and guide hole 43 for receiving pin 33 are associated with the housing member 27 as shown in FIG. 5 so as to assure alignment of the two housing members when they are assembled and clamped together as shown in FIG. 3.

The novel magnet assembly of the present invention includes strip members 39 and 40 mounted in the channels 31 and 32 and constructed as described more in detail below and backup members 36 and 37 of suitable magnetic material or metal radially inwardly of the strip members and also in the channels 31 and 32. The construction is such as to present relatively large numbers of alternate north and south poles around the periphery of the housing 25.

The magnetic members 39 and 40 are preferably formed from a single strip or blank of magnetic material generally designated by reference numeral 50 in FIG. 7. The magnetic material may be of known composition which is flexible to permit assembly with the housing members. Preferably the magnetic material comprises a flexible plastic or rubberlike material binder and finally divided permanently magnetizable ferrite or other suitable material embedded therein. One such material is commercially available under the trademark Koroseal which is an extruded flexible magnetic material obtainable from the B. F. Goodrich Company and another is sold under the trademark Plastiform obtainable from the 3M Company. The blank or strip of material 50 is permanently magnetized so as to have a north pole at one side thereof and a south pole at the opposite side.

In accordance with a feature of the present invention, the magnetic members 39 and 40 are formed by stamping or cutting the strip 50, preferably in a castellated configuration as shown in broken lines in FIG. 7. Thus member 39 is provided with a series of spaced pole elements 52 as shown in FIG. 8 separated by spaces 56 and connected by a longitudinally extending marginal portion or element 53. The magnetic member 39 also has an extended end segment at one end adapted to abut the member 40 in the final assembly. The magnetic member 40 is similarly formed with a plurality of spaced apart magnetic pole elements 58 separated by spaces 59 but connected by marginal elements 55. Member 40 also has an extended end portion 60 which abuts the member 39 when the magnetic members 39 and 40 are assembled in the housing members 26 and 27 so as to form a continuous annular magnetic assembly within the housing. The members 39 and 40 are secured and sealed within the housing members by a proxy or other suitable sealing means.

In this embodiment, the strips 39 and 40 are magnetized so that all of the elements 52 and 58 have one pole, for example a north pole, at their radially outwardly facing sides or surfaces and the opposite pole at their radially inwardly facing sides. Furthermore, as seen, in this embodiment, the members 39 and 40 are arcuately bent from the flat condition of the original blank so that the elements 52 and 58 extend generally axially of the unit 20. Thus these elements present a series of circumferentially spaced like poles around and facing radially outwardly of the housing 25.

The previously mentioned backup rings or members are positioned radially of the magnetic members 39 and 40 respectively. The rings 36 and 37 are formed of a soft ferrite or other nonpermanently magnetizeable material and are magnetized by the members 39 and 40 so that their radially outwardly facing surfaces have the same polarity as the radially inwardly facing sides of the members 39 and 40. Furthermore, it is noted that the ring members 36 and 37 traverse the spaces 56 and 59 and thus present radially outwardly facing pole surfaces between the elements 52 and 58 which are opposite in polarity to the outer sides of the elements 52 and 58. In other words, the magnet structure comprising the combination of the strips 39 and 40 and the backup rings 36 and 37 presents two series of alternate relatively strong outwardly facing north and south poles around the periphery of the housing.

In FIG. 9, there is shown the magnetic pole configuration of the material used in the strips 39 and 40. A north pole is formed at one side thereof and a south pole at the other side. In addition, FIG. 10 shows the combination of the magnetic or metal backing element such as element 36 with the strip 39 and the manner in which the backing element is magnetized by strip 39 so that its upper side or surface presents a pole facing upwardly and traversing the space between adjacent elements 52 of the strip 39. Thus the magnet structure presents strong alternate north and south poles along the periphery of the unit 20. The configuration of the magnetic lines of flux is such that it is readily detectable by a magnetic pickup device 21 located in close proximity to the periphery of the housing. By providing such alternate north and south poles, more easily detectable variations in the magnetic lines of flux are provided and therefore the actual spacing between the housing of the unit 20 and the pickup element 21 is not critical. This facilitates installation of a new magnetic unit or pickup unit.

Referring now to FIG. 11, an alternate form of the present invention is shown. Here the magnetic unit is provided with a disc shaped housing adapted to be clamped to a shaft or rotatable member 21 by clamping ring or hose clamp 72. The clamp 72 fits between a plurality of protuberances 73 formed about the periphery of a flange 74 and the endwall of the housing. The disc shaped housing is provided with partable complementary members or halves 76 and 77 which are held together by the clamp 72. A magnetic material backing 78 comprising complementary elements 81 described below covers one face of the disc 70 and functions in a manner similar to the backing rings 36 and 37 described above.

Figure 12:
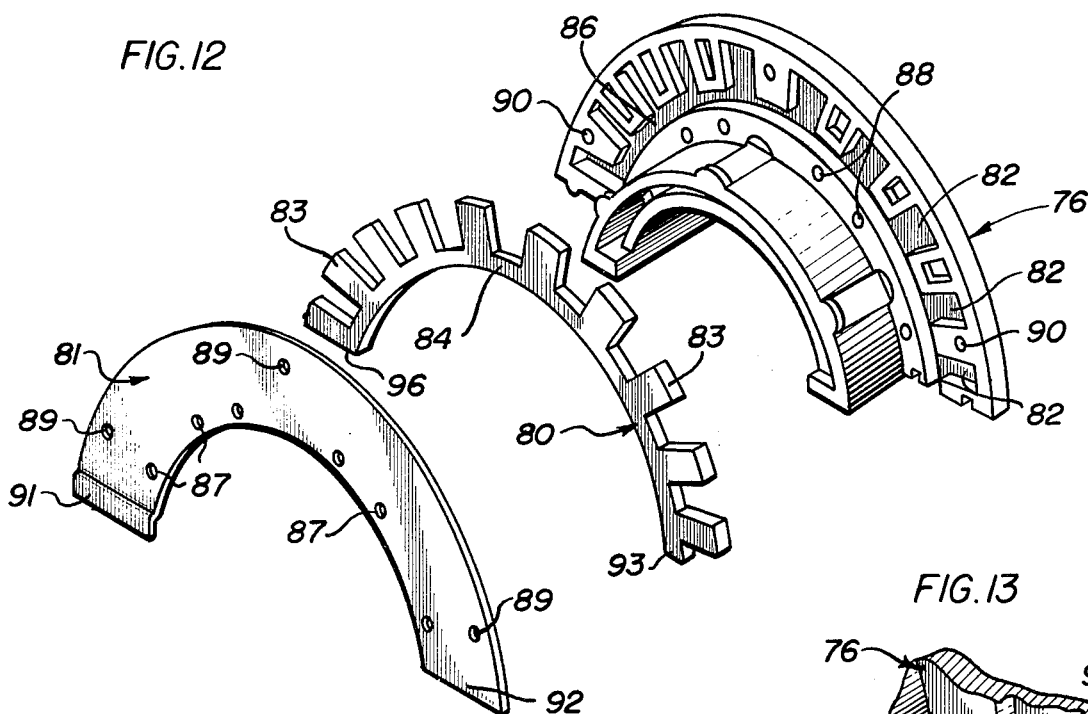
FIG. 12 is an exploded view of one-half of the magnetic structure shown in FIG. 11.
Figure 13:
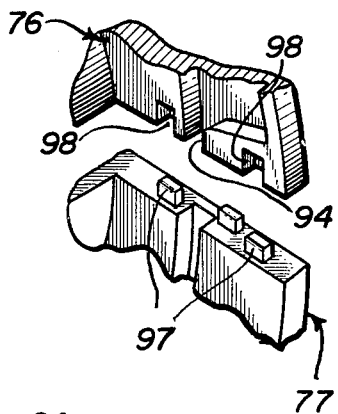
FIG. 13 is a detail of the interlocking tabs and magnetic material utilized in accordance with the principles of this invention.

For a better understanding of the structure of FIG. 11, reference is made to FIG. 12 which shows the housing member 76 together with an associated magnetic member 80 which may be economically stamped from a strip of flexible magnetic material in the same manner as the strips 39 and 40 described above. However in this embodiment, the strip 80 is bent so that the pole elements 83 thereof which correspond to the previously described pole elements 53 project radially rather than axially of the unit.

The magnetic backup element or cover plate 81 is formed to overlie one radial side of the magnetic member 80. The housing member 76 preferably is a molded plastic member having a plurality of recesses 82 formed therein. These recesses are of the same size and configuration as and are adapted to receive and house the radially outwardly directed pole elements 83. A common edge portion 84 of the member 80 interconnects the pole elements 83 in an arcuate fashion, which edge portion fits into a semi-annular recess 86 in the housing.

Once the magnetic member 80 is in place, the backup member 81 is positioned so that a plurality of apertures 87 along an inner margin thereof engages protuberances 88 formed on the housing member 76. The protuberances 88 maintain the magnetic backup member 81 in alignment with the housing member. Apertures 89 adjacent the outer periphery of the magnetic member 81 are in alignment with apertures 90 in the housing and are adapted to receive fasteners such as bolts or rivets. The magnetic backup plate 81 has one end thereof formed with a step or offset portion 91. It is understood that the embodiment of FIGS. 11 and 12 includes members identical to and complementary to the housing member 76, the magnetic strip 80 and the backup member 81, which complementary members are provided to complete the assembly of FIG. 11. In this assembly, the offset portion 91 at one end of each of the backup plates overlaps a flat free edge portion 92 at the other end of each backup plate to provide a continuous circle of magnetic material overlying a circle of discrete magnetic pole elements 83. Thus, a continuous circle of alternate north and south poles is provided, but in this embodiment the poles face axially of the unit rather than radially of the unit as in the first described structure.

As shown in FIG. 12, and end 93 of magnetic member 80 extends through a slot 94 in the housing 76 for abutting an adjacent end of the complementary magnetic strip which is flat or straight, similar to the end 96. This arrangement insures a substantially continuous circle of magnetic material. Guide pins 97 are provided on one of the housing members to engage correspondingly shaped recesses 98 in the other housing member.

Figure 14:
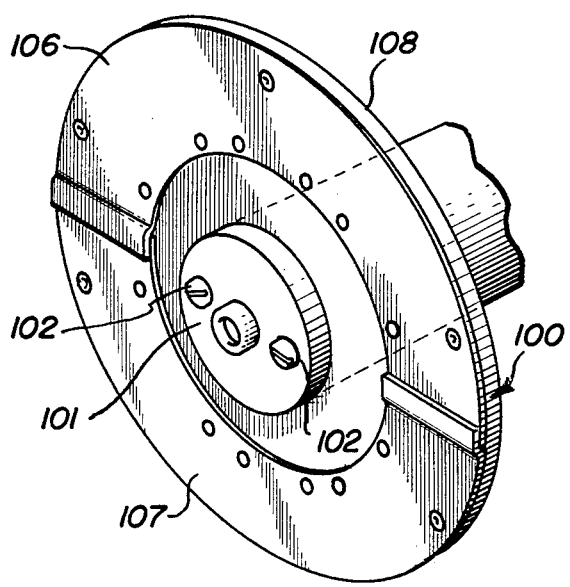
FIG. 14 is still another alternate embodiment of a magnetic sensor constructed in accordance with the principles of this invention.
Figure 15:
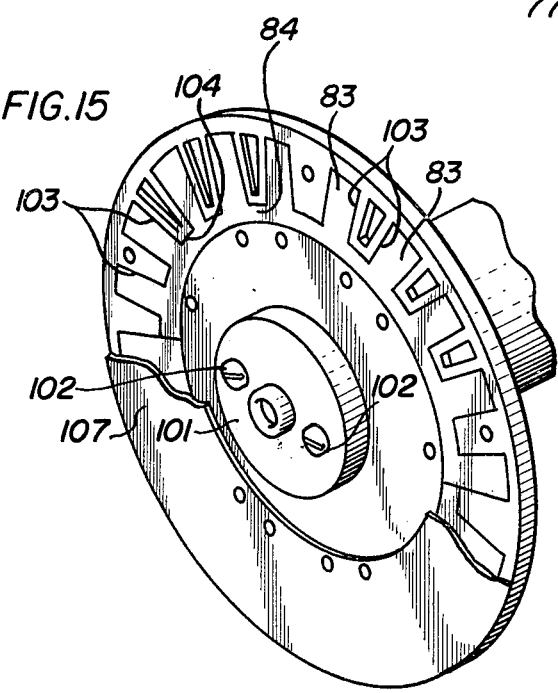
FIG. 15 illustrates the internal construction of the magnetic sensor of FIG. 14.

FIGS. 14 and 15 illustrate still another alternate embodiment of a magnetic unit for a shaft rotation sensing device constructed in accordance with the principles of this invention. Here a single continuous disc housing 100 is provided with a central hub portion 101 for receiving a pair of fasteners 102. The fasteners 102 are shown as screws. However, other suitable fasteners may be utilized. This unit is adapted to utilize magnetic strips such as the strip 80 shown in FIG. 12. Thus the housing is provided with a plurality of equally spaced apart recesses 103 to receive the magnetic segments 82. The magnetic segments 83 are captured in the recesses and the central margin portion 84 is inserted into a continuous annular recess 104. A pair of metal backup plates 106 and 107 are placed over the magnetic member to provide in combination therewith a plurality of alternate north and south poles to exist at the opposite face 108 of the disc 100. Therefore, the pickup device is placed in close proximity to the face 108 and the plurality of opposite north and south poles induce a plurality of signals into the pickup device to indicate that the shaft is rotating.

What has been described are several simple and efficient embodiments of a magnetic unit for a shaft rotation sensor constructed in accordance with the principles of this invention. While several embodiments have been illustrated herein, it will be understood that other variations and modifications may be incorporated without departing from the spirit and scope of the novel concepts disclosed and claimed herein.

The invention is claimed as follows:

1. A magnetic unit for use for monitoring rotation of a rotatable member comprising annular magnetic means, mounting means supporting said magnetic means and mountable for rotation with said member to be monitored, said annular magnetic means comprising a flexible permanently magnetized material strip having an arcuate portion and a plurality of integral pole elements projecting axially from said arcuate portion and disposed with spaces therebetween, said pole elements presenting like magnetic poles at first sides thereof facing radially in a first direction and opposite magnetic poles at second sides thereof facing radially in an opposite direction, and backup magnetic means of a nonpermanently magnetizable material adjacent said second radially facing side and traversing said spaces and presenting said opposite magnetic poles substantially traversing said spaces and facing radially in said first direction.

2. A magnetic unit for use for monitoring the rotation of a rotatable member comprising annular magnetic means, mounting means supporting said magnetic means and mountable for rotation with said member, said magnetic means comprising a plurality of permanent magnet pole elements disposed in an annular array with spaces therebetween, each of said pole elements presenting first like magnetic poles facing radially in a first direction and opposite like magnetic poles facing radially in an opposite direction, and backup nonpermanently magnetizable material means adjacent said opposite magnetic poles and traversing said spaces for presenting a series of said opposite magnetic poles facing radially in said first direction between said pole elements.

3. A magnetic unit as defined in claim 2 wherein said magnetic means comprises a flexible strip including an arcuate portion, said pole elements being integrally joined to and projecting radially with respect to said arcuate portion.

4. A magnetic unit as defined in claim 2 wherein said annular magnetic means includes a strip member comprising an arcuate portion, and said pole elements being integrally joined to and projecting generally axially of said arcuate portion.

5. A sensor for monitoring the rotation of a rotateable member including a magnetic unit as defined in claim 2, means mountable adjacent said unit and responsive to moving magnetic fields of said magnetic unit for providing signals correlated to rotation of said rotateable member, and means responsive to said signals for providing an indication of rotation of said rotateable member.

6. A magnetic unit for use for monitoring the rotation of a rotatable member comprising annular magnetic means, mounting means supporting said magnetic means and mountable for rotation with said member, said magnetic means comprising a plurality of permanent magnet pole elements disposed in an annular array with spaces therebetween, said pole elements presenting first like magnetic poles facing in a first direction and opposite like magnetic poles facing in an opposite direction, and backup magnetic material means adjacent said opposite magnetic poles and traversing said spaces for presenting a series of said opposite magnetic poles facing in said first direction between said pole elements, said mounting means comprising a plurality of complementary separable molded plastic housing members, said annular magnetic means comprising a like plurality of complementary magnetic assemblies respectively carried by said housing members, said magnetic assemblies having substantially abutting end portions when said housing members are in assembled relationship, each of said magnetic assemblies including a strip having an arcuate portion and a plurality of said pole elements integral with and projecting from said arcuate portion, and each of said magnetic assemblies including a portion of the backup magnetic means comprising a plate of nonpermanently magnetizable material substantially abutting the strip.

7. A magnetic unit for use for monitoring rotation of a rotatable member comprising annular magnetic means, mounting means supporting said magnetic means and mountable for rotation with said member to be monitored, said annular magnetic means including a plurality of pole elements of permanently magnetized material positioned with spaces therebetween, means formed of said permanently magnetized material integrally joining said four elements, said mounting means and said annular magnetic means comprising a plurality of complementary separable parts adapted to be assembled around a rotatable member to be monitored, said mounting means comprising main housing body members for receiving and retaining the annular magnetic means and flange portions projecting from said body members, and hose clamp means for encircling said flange portions and securing said parts in assembled relationship.

* * * * *